United States Patent [19]
Langley et al.

[11] Patent Number: 5,637,191
[45] Date of Patent: Jun. 10, 1997

[54] TREATMENT OF CELLULOSIC MATERIAL AND COMPOSITIONS FOR USE IN THIS

[75] Inventors: John G. Langley; Timothy G. Bingham; John O. Stockwell, all of West Yorkshire, England

[73] Assignee: Allied Colloids Limited, West Yorkshire, England

[21] Appl. No.: 323,737

[22] Filed: Oct. 17, 1994

Related U.S. Application Data

[63] Continuation-in-part of PCT/GB93/00780, Apr. 14, 1993, published as WO93/21376.

[30] Foreign Application Priority Data

Apr. 15, 1992 [GB] United Kingdom .................. 9208293
Oct. 27, 1993 [GB] United Kingdom .................. 9322118

[51] Int. Cl.$^6$ ........................................ D21C 5/02
[52] U.S. Cl. ........................ 162/5; 162/8; 162/72; 162/76; 162/78
[58] Field of Search ................... 162/5, 6, 8, 13, 162/72, 76, 78

[56] References Cited

U.S. PATENT DOCUMENTS

| | | | |
|---|---|---|---|
| 1,925,372 | 9/1933 | Darling | 92/13 |
| 2,525,594 | 10/1950 | Fennell | 92/1.5 |
| 4,162,186 | 7/1979 | Wood et al. | 162/5 |
| 4,347,099 | 8/1982 | De Ceuster et al. | 162/5 |
| 4,360,439 | 11/1982 | Calmanti et al. | 252/61 |
| 4,780,179 | 10/1988 | Clement | 162/5 |

FOREIGN PATENT DOCUMENTS

| | | | |
|---|---|---|---|
| 2281456 | 8/1975 | France | D21G 5/00 |
| 2178079 | 2/1987 | United Kingdom | D21C 5/02 |
| 9010749 | 9/1990 | WIPO | D21C 5/02 |
| 9302967 | 2/1993 | WIPO | C02F 1/52 |
| 9302966 | 2/1993 | WIPO | C02F 1/52 |
| 9321376 | 10/1993 | WIPO | D21C 5/02 |

*Primary Examiner*—David A. Redding
*Attorney, Agent, or Firm*—Sughrue, Mion, Zinn, Macpeak & Seas

[57] ABSTRACT

A process of de-inking waste paper can be operated under conditions using a simple combination of chemicals to result in a waste liquor that is substantially environmentally friendly. The process comprises forming a pulp from the waste paper in a aqueous medium that has a pH of between 6 and 9 and that is substantially free of dissolved phosphate and that includes an ink-dispersing amount of polycarboxylic acid dispersing agent, and separating the ink from the pulp. The use of a cationic surfactant for promoting flotation is particularly desirable.

20 Claims, No Drawings

TREATMENT OF CELLULOSIC MATERIAL AND COMPOSITIONS FOR USE IN THIS

This application is a continuation-in-part of the U.S. designation in PCT/GB93/00780 (WO 93/21376) filed 14th Apr. 1993 by John Graham Langley.

This invention relates to the de-inking of waste paper. In this specification we use the term "paper" to be generic to cellulosic sheet materials including filled and unfilled papers and paper board.

It is standard practice to reclaim waste paper to allow the reclaimed paper fibres to be used as part or all of the stock of subsequent paper production. The waste paper needs to be de-inked and it is standard practice to achieve this by forming a pulp from the waste paper in an aqueous medium that includes de-inking chemicals, and separating the ink from the pulp. This separation may be by, for instance, washing and/or flotation.

Typical chemical processes for de-inking are described in U.S. Pat. Nos. 1,925,372, 2,525,594, 4,347,099 and 4,780,179, WO90/10749 and FR 2,281,456. As is apparent from these publications, typical de-inking chemicals have comprised a complex mixture of chemicals. Generally they include a significant amount of alkaline material, with sodium silicate, hydroxide and carbonate frequently being proposed.

The literature shows that the pH of the resultant pulp during the de-inking process is usually high, for instance above 9 and most usually above 10. Exposing the cellulosic fibres to this degree of alkalinity tends to cause yellowing of the fibres and so it is generally necessary to add a peroxide as a bleaching agent.

It is also known to include various other additives. For instance in U.S. Pat. No. 4,347,099 it is proposed to use a mixture of sodium hydroxide, hydrogen peroxide, a carboxylic polymer (usually polyacrylic acid or, preferably, poly hydroxy acrylic acid), dispersants such as anionic, cationic or non-ionic surface active agents, and other additives such as collectors, foaming agents, alkali silicates and pH regulators. The use of this complex and highly alkaline mixture is undesirable since the liquor that results from the de-inking process results in environmental disposal problems.

A simpler composition is described in WO90/10749 and has been commercialised under the trade name Ennesco D and apparently consists solely of a mixture of sodium carbonate and sodium phosphate, optionally with hydrogen peroxide. The use of this can reduce some environmental problems but it introduces others, since the presence of large amounts of dissolved phosphate in the de-inking liquor is environmentally undesirable.

It would therefore be desirable to be able to provide a de-inking process that could be operated under conditions that used a simple combination of chemicals that resulted in a waste liquor the disposal of which created less environmental problems than the disposal of the highly alkaline and/or phosphate-containing liquors that result from the known processes.

A process according to the invention of de-inking waste paper comprises forming a pulp from the waste paper in an aqueous medium that has a pH of between 6 and 9 and that is free of dissolved phosphate and that includes an ink-dispersing amount of a dispersing agent, and separating the ink from the pulp wherein the dispersing agent comprises material selected from polymers of ethylenically unsaturated monomeric material comprising ethylenically unsaturated carboxylic acid salt and has molecular weight in the range 1,000 to 200,000.

The pH of the aqueous medium during the de-inking process must be sufficiently high to assist release of the ink from the cellulosic fibres, and for this purpose it needs to be nearly neutral or slightly alkaline. Accordingly the pH must be at least 6, and often at least 6.5. For best results it is generally at least 7.0. The pH must not be too high as otherwise it will cause yellowing of the fibres and so must be below 9. Generally it is below 8.5 and frequently satisfactory results can be achieved at values up to about 8.

The desired pH may follow inevitably from the use of the chosen paper and dispersing agent. For instance if the paper is substantially neutral or slightly alkaline (when dispersed in water) the desired pH may be achieved merely by dispersing the paper in water in the presence of the desired polymeric dispersing agent, especially when that is introduced as an alkali salt. Often, however, it is desirable to make a deliberate addition of an alkali material and any environmentally acceptable, water soluble, alkali material can be used for this purpose, for instance sodium hydroxide or sodium silicate. Preferably the added alkali material has a buffering capacity so as to tend to hold the pH at a chosen value, and the preferred materials for this purpose are sodium bicarbonate and, especially, sodium carbonate.

The efficiency of the de-inking process, including the efficiency of the initial release of the ink from the fibres, can be significantly influenced by the pH that prevails during the process. Fluctuations in the pH can result in fluctuations in the efficiency of de-inking. The waste paper that is used as the feed for de-inking processes can be of a wide variety of paper types, some of which may tend to be acidic while others tend to be alkaline. The incorporation of a buffer that will hold the pH of the stock at a preselected, substantially constant, pH despite variations in the nature of the paper therefore has the advantage of helping to maintain the de-inking performance at a uniform and satisfactory level.

Although the alkalinity is, for economy, generally introduced by the use of sodium salts or other compounds, it is also possible to use the equivalent potassium, ammonium or water soluble amine compounds.

The polymeric dispersing agent is preferably an anti-redeposition agent, for instance of the type used in laundry detergent compositions. Suitable anti-redeposition agents are water soluble polymers formed from ethylenically unsaturated monomeric material comprising ethylenically unsaturated carboxylic or sulphonic groups.

The polymeric dispersing agent serves as an effective dispersing agent for the ink without interfering with the subsequent procedures for separating the ink from the fibres and without interfering with the subsequent procedures for collecting the fibres into a paper sheet material. Its molecular weight (measured by gel permeation chromatography) should normally be above 1,000 and generally above 2,000. Generally it is below 150,000 and often it is below 100,000, preferably below 80,000. Values below 50,000 are often preferred. Best results may be obtained when the molecular weight is in the range 2,000 to 20,000 but good results are also obtained with polymers having molecular weights of for instance 75,000 or 120,000.

If it is desired to provide the de-inking chemicals in solid form, it is convenient for the molecular weight to be sufficiently high to facilitate the formulation of the product as a solid, in which event the molecular weight is generally above 5,000 and frequently in the range 7,000 to 20,000. However when the de-inking chemicals are formulated as a solution the molecular weight can be lower. Best results are often obtained in the range 2,000 to 10,000, often around 2,500 to 6,000.

The monomeric material from which the polymeric dispersing agent is formed comprises ethylenically unsaturated carboxylic acid. This can be methacrylic acid, maleic acid, crotonic acid, itaconic acid or any of the other polymerisable carboxylic acids, but preferably it is acrylic acid or a mixture of acrylic (or sometimes methacrylic) acid with maleic acid (frequently including anhydride). The acrylic acid or other carboxylic monomeric material can be polymerised alone or with sulphonic monomer such as 2-acrylamido methyl propane sulphonate (AMPS, U.S. trade mark), vinyl sulphonate or (meth) allyl sulphonate, and/or it can be copolymerised with non-ionic monomer, especially acrylamide. Generally the carboxylic monomer constitutes at least 50% by weight of the monomers and preferably the polymer is formed from carboxylic monomer alone or a blend consisting of carboxylic and sulphonic monomers. Suitable polymers include polyacrylic acid, copolymers of this with maleic anhydride, and copolymers of acrylic acid with 10–50% by weight AMPS.

The polymer preferably has polydispersity below 2, preferably below 1.8 and most preferably below 1.5, and generally above 1.1, for instance as described in EP 129,329.

Good results can be obtained using mixtures of the polymer with another dispersing agent, in particular mixtures of one of the described polymeric dispersing agents, especially polyacrylic acid or a copolymer of acrylic acid with maleic acid (including anhydride) or AMPS, with a polyphosphonate or sequestering agent or CMC or methyl cellulose. The components in such mixtures typically are present in proportions ranging from 1:3 to 3:1 by weight.

Other suitable dispersing materials that can be used with the polymer in the invention, and which are frequently also suitable for use as anti-redeposition aids, include cellulosic derivatives, polyphosphonates, bentonites, and sequestering agents.

Suitable cellulosic derivatives include cellulose ethers, such as methyl cellulose, and carboxy methyl cellulose.

Suitable bentonites include the various swelling clays that are referred to colloquially as bentonites, including true bentonite, Fuller's Earth, hectorite and various swelling montmorillonites, such as activated calcium montmorillonite.

Suitable sequestering agents are amino carboxylic acid sequestering agents, such as ethylene diamine tetro acetic acid and nitrilo tri acetic acid.

Soluble phosphate should not be incorporated deliberately. Impurity amounts may be tolerated but preferably the amount is substantially zero.

The aqueous medium preferably also includes a surfactant, generally a non-ionic surfactant such as an ethoxylated phenol or fatty alcohol. The surfactant is preferably suitable for emulsifying oil into water. Although the incorporation of a surfactant is useful when the final separation of the ink from the pulp is to be by flotation, the incorporation of the surfactant is of particular value when the separation is by washing.

When the separation is by flotation, a collector or other conventional flotation aid may be incorporated in conventional manner.

The invention also includes compositions suitable for incorporation in the pulp and comprising the polymeric dispersing agent and other additives that are incorporated, and in particular it comprises compositions comprising the polymeric dispersing agent and an alkaline material, preferably a buffering alkali such as sodium carbonate or sodium bicarbonate. Particularly preferred compositions are solid compositions in which the polymer has a molecular weight above 5,000 (often above 7,000), but below 200,000 or 150,000, and often below 50,000 or 20,000, and the alkali is sodium bicarbonate or, preferably, sodium carbonate. In general, the materials and molecular weights may be as described above.

The proportions of alkaline material and dispersing agent, on a dry weight basis, are generally 1:5 to 5:1 by weight, most preferably 2:1 to 1:2.

The amount of dispersing agent that is required for optimum performance can be selected by routine experimentation and is normally in the range 0.01 to 1% by weight based on the dry weight of the pulp, generally 0.05 to 0.5%. The amount of surfactant generally falls within the same ranges.

The de-inking may be conducted in the presence of additional materials but a particular advantage of the invention is that the chemicals used for it can consist essentially only of the polycarboxylic dispersing agent, buffering alkali, optional surfactant and optional flotation aids and collectors. Peroxide can be included if desired, but an advantage of the invention is that it is usually unnecessary. Accordingly the liquor resulting from the de-inking is relatively free of materials that would create environmental problems during disposal.

The de-inking process can be carried out in broadly conventional manner, except for the choice of the de-inking chemicals, as described above. The de-inking chemicals can be included in the aqueous liquor into which the waste paper is initially pulped, or the waste paper can be pulped to form an aqueous pulp into which the de-inking chemicals are then incorporated.

The overall de-inking process generally comprises a series of stages, typically consisting of an initial maceration or pulping stage (preferably conducted under very high shear), a screening stage to remove grit and oversized particles, one or more washing or flotation stages, and a thickening stage to form a clean pulp that can either be used as such or that may be drained to form a dried pulp. Typical de-inking processes are described in more detail in, for instance, Handbook for Pulp and Paper Technologists by G. A. Smook.

To demonstrate the benefit of the invention, the following experiment was conducted. The experiment was designed for use in the laboratory to give a good indication of the results that may be obtained in practice in a washing de-inking plant comprising the steps of pulping, thickening, washing and re-washing, in that order.

1. Mixture of 70% newsprint and 30% magazine was pulped with the specified de-inking chemicals included, at 3½% consistency for 20 minutes in a standard laboratory pulp disintegrator at 45° C.
2. For the blank test a sample of an equivalent pulped stock was provided, but having had no de-inking chemicals added to it, and was formed into a pad for brightness measurement=PAD A.
3. 1000 mls of the pulped stock was thickened to 10% consistency (to a weight of 300 g) over a 710 micron stainless steel sieve.
4. For all tests, a portion of this thickened stock was formed into a brightness pad for brightness measurement=PAD B.
5. 200 g of the thickened pulp was diluted to 2000 mls using fresh water-consistency of 1%.
6. The diluted stock was thickened over a 710 micron stainless steel sieve to a weight of 200 g.
7. Stages 5 and 6 were repeated using fresh water.

8. A portion of the final washed stock was formed into a brightness pad for brightness measurement=PAD C.

The brightness of pads A, B and C were determined using a Technibrite reflectance spectrophotometer set to measure at 457 nm.

The brightness of pad A was 41.4.

When no de-inking chemicals were included, the brightness values on pads B and C were 43.1 and 43.9 respectively.

In the following all % values represent % by weight of dry chemicals based on the dry weight of the pulp.

When the de-inking chemicals were a mixture providing 0.15% sodium carbonate, 0.15% sodium polyacrylic acid of molecular weight in the range 2,500 to 10,000, and 0.25% nonyl phenol ethoxylate, the brightness values were 48.9 and 50.3 respectively.

When 0.3% solid sodium polyacrylic acid of molecular weight in the range 2,500 to 10,000 was added the brightness values were 45.8 and 49.6 respectively.

When 0.3% liquid sodium polyacrylic acid of molecular weight 2,500 to 6,000 was added the brightness values were 44.6 and 48.1 respectively.

When the chemicals added at the de-inking stage consisted of 0.3% ethylene diamine tetracarboxylic acid (sodium salt) the values on pads B and C were 45.1 and 45.2 respectively.

When a mixture of 0.15% of this compound with 0.15% of a copolymer of acrylic acid and AMPS was used, similar values were obtained.

When carboxyl methyl cellulose was used (as sodium salt) values of 44.7 and 48 respectively were obtained.

When 0.3% of the sodium salt of a polyphosphonate was used, values of 45.1 and 47.5 respectively were obtained, and slightly higher values were obtained when 0.15% of the same polyphosphonate was used with 0.15% sodium carbonate.

When 0.3% sodium activated calcium montmorillonite was used, values of 43.9 and 47.4 respectively were obtained.

The results illustrate that an improvement in brightness can be achieved on both pads B and C by inclusion of the specified de-inking chemicals. However, it is acceptable to achieve an improvement on pad C only, and not pad B, since the presence of a greater amount of free water in pad C tends to be more conducive to ink removal.

We have also found that particular benefits are obtained when the process is conducted in combination with a cationic surfactant, especially for some types of inks.

A typical de-inking process can comprise forming a pulp of the paper in the presence of the de-inking chemicals so as to disperse the ink into the pulp and then subjecting the resultant pulp to flotation to provide a Reject fraction that contains the floated ink components with a minimum of paper fibres, and an Accept fraction containing the paper fibres with a minimum of the ink components.

Various inks may be present in the paper that is to be de-inked and many of them comprise a binder and pigment. Many of the binders dissolve or soften sufficiently in the presence of the de-inking chemicals and/or during the pulping stage in order to release the pigment as a dispersion in the pulp. For instance many binders are alkali-soluble or alkali-swellable and the alkaline conditions prevailing in a conventional de-inking pulp will be sufficient to release the ink from the paper fibres and to release the pigment from the binder. As a result, the pulp has finely dispersed pigment throughout it and a test of a good de-inking process is the whiteness of a sheet made from the Accept fraction, optionally after washing it. The finely dispersed pigment has a tendency to cause an overall grey coloration if the de-inking process is inefficient.

However in addition to the problem of overall greyness, there is also a problem of visible specks in a sheet made from the Accept fraction. These specks arise when the ink particles on the paper that is to be de-inked are resistant to the de-inking chemicals and the pulping conditions as a result of the particles comprising a pigment and a binder that is resistant to these conditions (hereinafter referred to as a resistant binder). For instance a binder that is soluble or swellable at pH 9 sufficient to release pigment particles at that pH may not adequately release them when the pulping and de-inking process is conducted at a lower pH.

A particular problem arises when the ink was applied by laser printing or by Xerographic or other photocopying techniques since ink deposits bonded by the binders used in these processes have a tendency to be released from the pulp but to remain as dispersed particles of bonded pigment. Binders that are chemically cross linked are liable to promote this problem. The ink particles can be relatively large and so have a severe tendency to remain trapped by the fibres in the Accept fraction in preference to being floated with any dispersed pigment in the Reject fraction. As a result, sheets made from the Accept fraction may have very good whiteness (as a result of good removal of any dispersed pigment by the de-inking process) but may have a significant number of visible specks (as a result of resistant ink particles remaining in the Accept fraction).

The increasing tendency to de-ink at relatively low pH values and the increasing amounts of laser or photocopier printed papers in paper waste means that there is an increasing problem in de-inking processes, and there is a need to find a way of reducing the speck contamination of the Accept fraction whilst maintaining good whiteness.

A process according to this aspect of the invention of de-inking paper carrying resistant ink particles comprising a resistant binder and a pigment comprises forming a pulp of the paper in the presence of a carboxylic acid polymer as described above, optionally with other de-inking chemicals, to cause dispersion of the resistant particles in the pulp substantially without release of pigment from the particles, adding to the resistant pulp a surfactant which promotes preferential flotation of the resistant ink particles, separating the ink particles by flotation of the Reject fraction, and thickening the Accept fraction.

Preferably the de-inking is conducted at pH 6.5 to 8.5 using a cationic surfactant (as explained below).

Thus in this aspect of the invention the flotation step is optimised so as to obtain optimum flotation of the resistant ink particles and we generally find that it is possible to do this without adversely affecting the whiteness due to dispersion of pigment in the pulp. In some instances it is desirable to subject the pulp to a plurality of flotation stages in which event one of the flotation stages may be optimised for removing dispersed pigment in the Reject fraction and another flotation stage may be optimised for removing resistant ink particles in the Reject fraction. For instance the surfactant may be added to the Accept fraction from a previous flotation stage so that dispersed pigment is primarily removed during the previous flotation stage and the resistant particles are primarily removed during the later flotation stage.

It is also possible to conduct a pulping and flotation de-inking process to remove dispersed ink and then to conduct pulping on the Accept fraction from the first process followed by flotation to remove resistant ink particles, or the process can be conducted the other way round.

De-inking at high alkalinity (e.g., pH 9–10) generally results in the formation of various soaps in the pulp and these soaps act as anionic materials that will promote flotation of dispersed pigment, but not of resistant particles. However it is possible to improve flotation with respect to the flotation of resistant ink particles by adding a surfactant after the pulping stage. The surfactant addition can be selected such that it promotes preferential flotation of the resistant ink particles. For example some surfactants will promote a very high degree of foaming and flotation of ink particles and fibre, with the result that a substantial amount of fibre is lost in the Reject fraction and so this is not a satisfactory promotion of the preferential flotation of resistant ink particles.

It is sometimes possible to obtain useful promotion of preferential flotation of resistant ink particles at these pH values using non-ionic or anionic surfactants, but it is particularly preferred to use cationic surfactants (as defined below).

When the pH in the pulp containing the de-inking chemicals is a little lower, e.g., down to about 8.5 or 8.1, again it can be possible to obtain useful promotion of preferential flotation of the resistant ink particles using non-ionic or anionic surfactants, but best results are obtained using cationic surfactants, as defined below. When the pH is not above 8, and especially when it is below 7, for instance in the range 4 to 6, it is particularly preferred to use a cationic surfactant for promoting preferential flotation.

In an important aspect of the invention, a cationic surfactant (as hereinafter defined) is used for promoting the preferential flotation of the resistant ink particles in processes in which the de-inking chemicals comprise a polymeric dispersing agent having molecular weight 1,000 to 200,000 and formed from ethylenically unsaturated monomers comprising anionic ethylenically unsaturated monomer (such as low molecular weight polyacrylic acid). In this aspect of the invention, the pH can be as high as 9 or 9.5 or even 10 but preferably is below 8.5 and most preferably is below 8. For instance it can be as low as pH 4 or 4.5 but is often in the range pH 6 or 6.5 to 7.5 or 8.

The pH values stated herein are the pH of the pulp after the inclusion of the de-inking chemicals and before the addition of flotation foaming agents, collectors or other additives. The de-inking chemicals can be included in the aqueous liquor into which the waste paper is initially pulped, or the waste paper can be pulped to form an aqueous pulp into which the de-inking chemicals are then incorporated, thereby resulting in pulping of the paper in the presence of the de-inking chemicals.

The de-inking processes conducted at high pH values can utilise de-inking chemicals including sodium hydroxide, sodium silicate and other highly alkaline materials, generally in combination with peroxide in known manner. Generally however the process is conducted using a mixture of sodium carbonate and sodium phosphate (as in WO90/10749) optionally with additional alkali to increase the pH or, preferably, at a pH of not more than 9 in the presence of an ink dispersing amount of a dispersing agent, for instance as described in PCT/GB93/00780.

Preferred processes of the invention comprise de-inking paper containing photocopy or laser ink by forming a pulp of the paper at a pH of below 8.5 or 9 and preferably below 8 that includes an ink dispersing amount of a dispersing agent which is preferably a polymer formed from ethylenically unsaturated monomers comprising anionic ethylenically unsaturated monomeric material and having molecular weight 1,000 to 200,000, adding a cationic surfactant (as hereinafter defined) tot he pulp to promote preferential flotation of particles of the photocopier or laser ink, separating the ink particles by flotation of the reject fraction and thickening the Accept fraction.

The pH of the pulp is preferably in the range 4 to 8, often 6.5 up to 8, and preferably a buffer (generally sodium bicarbonate or sodium carbonate) is included in order to maintain the pH at the chosen value. Preferably the de-inking system is substantially free of dissolved phosphate. This preferred process is applicable both to paper wastes that are formed mainly or wholly of laser printed or photocopier paper or to mixtures of office waste or other paper that merely contain a proportion of such paper, the remainder of the ink being of a type wherein the pigment in the ink is dispersed in the pulp as a result of the solubility or swellability of any binder present in the ink.

In addition to using a dispersing agent that is not a low molecular weight polymer, this can be used in combination with other suitable dispersing agents such as cellulosic derivatives, polyphosphonates, bentonites, and sequestering agents.

Suitable cellulosic derivatives include cellulose ethers, such as methyl cellulose, and carboxy methyl cellulose.

Suitable bentonites include the various swelling clays that are referred to colloquially as bentonites, including true bentonite, Fuller's Earth, hectorite and various swelling montmorillonites, such as activated calcium montmorillonite.

Suitable sequestering agents are amino carboxylic acid sequestering agents, such as ethylene diamine tetro acetic acid and nitrilo tri acetic acid.

Soluble phosphate should not be incorporated deliberately. Impurity amounts may be tolerated but preferably the amount is substantially zero.

Preferably, however, the pulp includes a polymeric carboxylic acid dispersing agent as the only dispersing agent. It serves as an effective dispersing agent for the ink without interfering with the subsequent procedures for separating the ink from the fibres and without adversely interfering with the subsequent procedures for collecting the fibres into a paper sheet material. We believe that this dispersing agent is adsorbed on to the resistant ink particles and then interacts with the subsequently added cationic surfactant to form a complex that promotes flotation of the ink particles.

The monomeric material from which the polymeric dispersing agent is formed preferably comprises ethylenically unsaturated carboxylic acid. This can be methacrylic acid, maleic acid, crotonic acid, itaconic acid or any of the other polymerisable carboxylic acids, but preferably it is acrylic acid or a mixture of acrylic (or sometimes methacrylic) acid with maleic acid (frequently including anhydride). The acrylic acid or other carboxylic monomeric material can be polymerised alone or with sulphonic monomer such as 2-acrylamido methyl propane sulphonate (AMPS, U.S. trade mark), vinyl sulphonate or (meth) allyl sulphonate, and/or it can be copolymerised with non-ionic monomer, especially acrylamide. Generally the carboxylic monomer constitutes at least 50% by weight of the monomers and preferably the polymer is formed from carboxylic monomer alone or a blend consisting of carboxylic and sulphonic monomers. Suitable polymers include polyacrylic acid, copolymers of this with maleic anhydride, and copolymers of acrylic acid with 10–50% by weight AMPS.

Good results can be obtained using mixtures of two or more of the dispersing agents, in particular mixtures of one of the described polymeric dispersing agents, especially polyacrylic acid or a copolymer of acrylic acid with maleic acid (including anhydride) or AMPS, with a polyphosphonate or sequestering agent or CMC or methyl cellulose. The components in such mixtures typically are present in proportions ranging from 1:3 to 3:1 by weight.

The de-inking chemicals, or the pulp to which they are added, can include a non-ionic surfactant such as ethoxylated phenol or fatty alcohol which is preferably of a type suitable for emulsifying oil into water. However it is generally preferred for the pulp to be formed in the absence of surfactant and for the cationic surfactant to be added after the formation of the pulp containing the de-inking chemicals.

In a modification, some or all of the cationic surfactant can be included with the other de-inking chemicals, for instance by being included initially in the water into which the waste paper is pulped or by being added with the dispersing agent and other de-inking chemicals to a preformed pulp of the waste paper.

When buffer material or other alkaline material is being included to raise the pH of the pulp the proportions of alkaline material and dispersing agent, on a dry weight basis, are generally 1:5 to 5:1 by weight, most preferably 2:1 to 1:2.

The amount of dispersing agent that is required for optimum performance can be selected by routine experimentation and is normally in the range 0.01 to 1% by weight based on the dryweight of the pulp, generally 0.05 to 0.5%.

The formation of the pulp may be conducted in the presence of additional materials but a particular advantage of the invention is that the chemicals used for it can consist essentially only of the dispersing agent, buffering alkali, optional surfactant and optional flotation aids and collectors. Peroxide can be included if desired, but an advantage of the invention is that it is usually unnecessary. Accordingly the liquor resulting from the de-inking is relatively free of materials that would create environmental problems during disposal.

The de-inking process can be carried out in broadly conventional manner, except for the choice of the de-inking chemicals, as described above. The de-inking chemicals can be included in the aqueous liquor into which the waste paper is initially pulped, or the waste paper can be pulped to form an aqueous pulp into which the de-inking chemicals are then incorporated.

The overall de-inking process generally comprises a series of stages, typically consisting of an initial maceration or pulping stage (preferably conducted under very high shear), a screening stage to remove grit and oversized particles, one or more flotation stages, and a thickening stage to form a clean pulp that can either be used as such or that may be drained to form a dried pulp. Typical de-inking processes are described in more detail in, for instance, Handbook for Pulp and Paper Technologists by G. A. Smook.

Thickening can be conducted on thickening drums in conventional manner, for instance to raise the solids content of the pulp from a concentration suitable for flotation to a concentration suitable for recycling to paper manufacture, for instance 5 to 15% dry weight. The Accept fraction from flotation may be subjected to washing with water or an aqueous solution of surfactant before or after thickening.

The cationic surfactant that is used in the invention can either be a true cationic surfactant (in the sense that it is cationically charged at the time it is added to the pulp) or it can be a free base surfactant which we believe can become cationically charged by interaction with the polycarboxylic or other dispersing agent or other component of the pulp. Suitable materials that can be used include ethoxylated fatty amines and fatty diamines and quaternary fatty ammonium compounds (i.e., quaternary ammonium compounds including at least one fatty group). The fatty groups can be naturally occurring or synthetic fatty groups, generally containing 6 to 24, often 8 to 18, carbon atoms. The fatty group is often alkyl.

The cationic surfactant can be a surfactant that includes both cationic and anionic groups (i.e., amphoteric) but preferably it is wholly cationic.

The following are examples of this aspect of the invention. In these examples de-inking component A represents a 50:50 mix of sodium polyacrylate having molecular weight around 5,000 and sodium carbonate while de-inking component B is a composition containing sodium phosphate and sodium carbonate as described in WO90/10749. Surfactant D is a cationic surfactant which is an ethoxylated fatty amine. Surfactant E is a cationic surfactant which is a C12 alkyl quaternary ammonium salt. Surfactant F is an amphoteric surfactant. Surfactant G is an anionic surfactant sodium lauryl sulphate. Surfactant H is a non-ionic surfactant sodium dioctyl sulpho succinate.

In each example 1.5 kg of waste paper carrying either laser print or Xerox print was pulped with 0.2% (based on the dry weight of waste) of de-inking component A or B and 10 litres of water under neutral conditions (in which event no addition of acid or alkali was made and the pH is not stated below) or with addition of sulphuric acid to give a pulping pH of 4.5 or sodium hydroxide to give a pulping pH of 9.5. The pulp was diluted to 1% and a sample was taken for speck analysis. The results of this analysis are quoted in column 1 below.

In this, and in all instances where a sample was taken for speck analysis, the sample was made into a handsheet, dried and a visual speck count of the dried handsheet was made. The results were assessed on a scale of 1 to 10 where 10 is the worst (highest number of specks) and 1 is the best (lowest number of specks).

In those instances where surfactant was to be added, it was then added to the pulp in an amount of 0.125%. The pulp, with or without surfactant, was then floated in a laboratory Voith flotation cell for 2 minutes. The Reject was scraped off the surface and the Accept after 10 minutes was sampled. Speck counts were made on each sample and the results are in column 2 below.

The 1% Accept after 10 minutes was thickened to 10% over a 710µm sieve and the thickened stock was sampled and a speck count was made. The results are in column 3 below.

In the tables below we set out the results obtained when pulping the laser or Xerox pulps with no de-inking additive, with soap or with de-inking chemicals A or B neutral, at pH 4.5 and at pH 9.5 and with the addition of surfactant D to H after the pulping and before the flotation.

TABLE 1

| Additives | Laser | | | Xerox | | |
|---|---|---|---|---|---|---|
| | 1 | 2 | 3 | 1 | 2 | 3 |
| Blank | 10 | 9 | 9 | 10 | 9 | 9 |
| Soap | 10 | 5 | 4 | 10 | 9 | 9 |
| A | 10 | 9 | 8 | 10 | 8 | 8 |
| A + D | 10 | 3 | 2 | 10 | 4 | 4 |
| A + G | 10 | 4 | 4 | 10 | 6 | 6 |

TABLE 1-continued

| Additives | Laser 1 | Laser 2 | Laser 3 | Xerox 1 | Xerox 2 | Xerox 3 |
|---|---|---|---|---|---|---|
| A + P | 10 | 5 | 4 | 10 | 6 | 6 |
| A + H | 10 | 6 | 5 | 10 | 7 | 7 |
| A + E | 10 | 3 | 2 | 10 | 3 | 3 |
| pH 4.5 A | 10 | 9 | 9 | 10 | 8 | 7 |
| pH 4.5 A + D | 10 | 6 | 5 | 10 | 6 | 5 |
| pH 4.5 A + G | 10 | 8 | 8 | 10 | 6 | 5 |
| pH 4.5 A + F | 10 | 7 | 7 | 10 | 7 | 6 |
| pH 4.5 A + H | 10 | 8 | 8 | 10 | 6 | 6 |
| pH 4.5 A + E | 10 | 7 | 6 | 10 | 6 | 6 |
| pH 9.5 A | 10 | 8 | 8 | 9 | 8 | 7 |
| pH 9.5 A + D | 10 | 4 | 3 | 9 | 4 | 4 |
| pH 9.5 A + G | 10 | 6 | 6 | 9 | 4 | 4 |
| pH 9.5 A + F | 10 | 5 | 4 | 9 | 4 | 4 |
| pH 9.5 A + H | 10 | 5 | 5 | 9 | 5 | 5 |
| pH 9.5 A + E | 10 | 6 | 6 | 9 | 5 | 4 |

TABLE 2

| Additives | Laser 1 | Laser 2 | Laser 3 | Xerox 1 | Xerox 2 | Xerox 3 |
|---|---|---|---|---|---|---|
| Blank | 10 | 9 | 9 | 10 | 9 | 9 |
| Soap | 10 | 5 | 4 | 10 | 9 | 9 |
| A | 10 | 8 | 8 | 10 | 8 | 8 |
| B + D | 10 | 3 | 3 | 10 | 6 | 6 |
| B + G | 10 | 3 | 4 | 10 | 6 | 6 |
| B + F | 10 | 5 | 5 | 10 | 6 | 5 |
| B + H | 10 | 5 | 5 | 10 | 6 | 6 |
| pH 4.5 B | 10 | 9 | 8 | 10 | 9 | 9 |
| pH 4.5 B + D | 10 | 4 | 4 | 10 | 6 | 5 |
| pH 4.5 B + G | 10 | 8 | 7 | 10 | 5 | 5 |
| pH 4.5 B + F | 10 | 6 | 6 | 10 | 6 | 6 |
| pH 4.5 B + H | 10 | 8 | 8 | 10 | 8 | 8 |
| pH 4.5 B + E | 10 | 4 | 3 | 10 | 5 | 4 |
| pH 9.5 B | 10 | 7 | 7 | 9 | 7 | 7 |
| pH 9.5 B + D | 10 | 4 | 3 | 9 | 6 | 5 |
| pH 9.5 B + G | 10 | 5 | 4 | 9 | 7 | 7 |
| pH 9.5 B + F | 10 | 4 | 4 | 9 | 6 | 6 |
| pH 9.5 B + H | 10 | 4 | 3 | 9 | 6 | 6 |
| pH 9.5 B + E | 10 | 4 | 4 | 9 | 6 | 5 |

These results clearly demonstrate the very considerable benefit that is obtained by the addition of surfactant after the pulping stage, especially when the surfactant is cationic. These results also show the particular benefit that is obtained when the pulping system includes polycarboxylic acid dispersant (component A) and when the pulping is at substantially neutral pH (for instance pH 6 to 8).

We claim:

1. The process of de-inking waste-paper, comprising the steps of pulping the waste-paper and separating the ink from the pulp, wherein the pulping comprises:
   (a) providing an aqueous pulping medium;
   (b) providing de-inking additive consisting essentially of an ink dispersing amount of a polymer formed from ethylenically unsaturated monomeric material comprising ethylenically unsaturated carboxylic acid salt having a molecular weight in the range 1,000 to 200,000 and a buffer for maintaining a pH of between 6 and 9 in the pulping medium during the pulping;
   (c) incorporating the de-inking additive into the aqueous pulping medium; and
   (d) pulping the waste-paper in the aqueous pulping medium at a pH of between 6 and 9.

2. The process according to claim 1 wherein the polymer has a molecular weight in the range 2,000 to 100,000.

3. The process according to claim 1 wherein the polymer is an acrylic acid homopolymer or a copolymer of acrylic acid with maleic acid or 2-acrylamido methyl propane sulphonate.

4. The process according to claim 1 wherein the polymer is a homopolymer of acrylic acid and has a molecular weight in the range 2,500 to 10,000.

5. The process according to claim 1 wherein the pH of the aqueous medium is in the range 6.5 to 8.

6. The process according to claim 1 wherein the buffer comprises sodium bicarbonate or sodium carbonate.

7. The process according to claim 1 wherein the proportions of buffer and polymer agent, on a dry weight basis, are in the range 1:5 to 5:1 by weight.

8. The process according to claim 1 wherein the amount of polymer is in the range 0.01 to 1% by weight based on the dry weight of the pulp.

9. The process according to claim 1, further comprising the steps of adding a cationic surfactant to the pulp, subsequently subjecting the pulp to flotation, and removing the ink with a reject fraction.

10. The process according to claim 9, wherein the cationic surfactant is selected from the group consisting of amphoteric surfactants, surfactants which are cationically charged before addition to the pulp, and surfactants that are in the form of a free base that can become cationically charged after addition to the pulp.

11. The process according to claim in which 9, wherein the surfactant is selected from the group consisting of ethoxylated fatty amines, fatty diamines, and quaternary fatty ammonium compounds.

12. The process of de-inking waste-paper, comprising the steps of pulping the waste-paper and separating ink from the pulp, wherein the pulping comprises:
   (a) providing an aqueous pulping medium;
   (b) providing de-inking additive consisting essentially of an ink dispersing amount of a polymer formed from ethylenically unsaturated monomeric material comprising ethylenically unsaturated carboxylic acid salts having a molecular weight in the range 1,000 to 200,000;
   (c) incorporating the de-inking additive into the aqueous pulping medium; and
   (d) pulping the waste-paper in the aqueous pulping medium at a pH of between 6 and 9.

13. The process according to claim 12, wherein the polymer has a molecular weight in the range 2,000 to 100,000.

14. The process according to claim 12, wherein the polymer is an acrylic acid homopolymer or a copolymer of acrylic acid with maleic acid or 2-acrylamido methyl propane sulphonate.

15. The process according claim 12, wherein the polymer is a homopolymer of acrylic acid and has a molecular weight in the range 2,500 to 10,000.

16. The process according to claim 12, wherein the pH of the aqueous medium is in the range 6.5 to 8.

17. The process according to claim 12, wherein the amount of polymer is in the range 0.01 to 1% by weight based on the dry weight of the pulp.

18. The process according to claim 12, further comprising the steps of adding a cationic surfactant to the pulp, subsequently subjecting the pulp to flotation, and removing the ink with a reject fraction.

19. The process according to claim 18, wherein the cationic surfactant is selected from the group consisting of amphoteric surfactants, surfactants which are cationically charged before addition to the pulp, and surfactants that are in the form of a free base that can become cationically charged after addition to the pulp.

20. The process according to claim 18, wherein the surfactant is selected from the group consisting of ethoxylated fatty amines, fatty diamines, and quaternary fatty ammonium compounds.

* * * * *